United States Patent
Zhang et al.

(10) Patent No.: US 11,822,550 B2
(45) Date of Patent: Nov. 21, 2023

(54) QUERY PROCESSING BASED ON STOCHASTIC PREDICTION MODEL

(71) Applicant: Dell Products L.P., Round Rock, TX (US)

(72) Inventors: Tao Zhang, Suzhou (CN); Yanjun Liu, Shanghai (CN); Zhiqiang Hu, Shanghai (CN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/735,720

(22) Filed: May 3, 2022

(65) Prior Publication Data

US 2023/0334047 A1      Oct. 19, 2023

(30) Foreign Application Priority Data

Apr. 14, 2022   (CN) .......................... 202210392422.2

(51) Int. Cl.
  *G06F 16/245*   (2019.01)
  *G06F 16/2453*  (2019.01)
(52) U.S. Cl.
  CPC .. *G06F 16/24545* (2019.01); *G06F 16/24537* (2019.01)
(58) Field of Classification Search
  CPC .................... G06F 16/24545; G06F 16/24537
  See application file for complete search history.

(56) References Cited

U.S. PATENT DOCUMENTS

2015/0039586 A1*  2/2015  Kerschbaum ..... G06F 16/24542
                                                     707/718

OTHER PUBLICATIONS

El-Ragal, Ahmed, et al., "Query Optimization Techniques for OLAP Applications: An ORACLE versus MS-SQL Server Comparative Study," The Second International Conference on Electronic Business Taipei, Taiwan, Dec. 2002.
Bellatreche, Ladjel, et al. "OLAP query optimization: A Framework for Combining Rule-Based and Cost-Based Approaches." (2005).

* cited by examiner

*Primary Examiner* — Baoquoc N To
(74) *Attorney, Agent, or Firm* — Ryan, Mason & Lewis, LLP

(57) ABSTRACT

Methods, apparatus, and processor-readable storage media for query processing based on a stochastic prediction model are provided herein. An example computer-implemented method includes maintaining information associated with a set of database operators corresponding to one or more historical query plans, wherein each of the historical query plans is associated with processing of a corresponding historical query in a database; building, based on the maintained information, a data structure comprising probabilities of each database operator in the set transitioning to each of one or more of the other database operators in the set; obtaining a new query to be processed in the database; applying a stochastic prediction algorithm to identify, from among the historical query plans, at least one candidate query plan for the new query based on the data structure; and executing the at least one candidate query plan to access data from the database for the new query.

20 Claims, 7 Drawing Sheets

| | SCAN T1 | SCAN T2 | LEFT JOIN T1T2 | INNER JOIN T1T2 | FILTER T1.P1= T2.P1 | FILTER T1.P2= T2.P2 | PROJECT1 | PROJECT2 |
|---|---|---|---|---|---|---|---|---|
| SCAN T1 | 0 | 0 | 0.3 | 0.7 | 0 | 0 | 0 | 0 |
| SCAN T2 | 0 | 0 | 0.3 | 0.7 | 0 | 0 | 0 | 0 |
| LEFT JOIN T1T2 | 0 | 0 | 0 | 0 | 0.8 | 0.2 | 0 | 0 |
| INNER JOIN T1T2 | 0 | 0 | 0 | 0 | 0 | 1 | 0 | 0 |
| FILTER T1.P1=T2.P1 | 0 | 0 | 0 | 0 | 0 | 0 | 1 | 0 |
| FILTER T1.P2=T2.P2 | 0 | 0 | 0 | 0 | 0 | 0 | 0 | 1 |
| PROJECT1 | 0 | 0 | 0 | 0 | 0 | 0 | 0 | 0 |
| PROJECT2 | 0 | 0 | 0 | 0 | 0 | 0 | 0 | 0 |

QUERY PROCESSING BASED ON STOCHASTIC PREDICTION MODEL

RELATED APPLICATION

The present application claims priority to Chinese Patent Application No. 202210392422.2, filed on Apr. 14, 2022 and entitled "Query Processing Based on Stochastic Prediction Model," which is incorporated by reference herein in its entirety.

FIELD

The field relates generally to information processing systems, and more particularly to query processing in such systems.

BACKGROUND

Programming languages, such as Structured Query Language (SQL), are often used to communicate with databases. For example, SQL statements can be processed by the database to request, modify, and/or add data. Generally, each statement is parsed by a parser to create a parse tree, which is transformed into a logical plan using relational algebra. An optimizer optimizes the logical plan to obtain multiple execution plans and estimates the cost of each execution plan. One of the execution plans is selected and sent to an execution engine for processing.

SUMMARY

Illustrative embodiments of the disclosure provide techniques for processing queries based on a stochastic prediction model. An exemplary computer-implemented method includes maintaining information associated with a set of database operators corresponding to one or more historical query plans, wherein each of the one or more historical query plans is associated with processing of a corresponding historical query in at least one database; building, based on the maintained information, a data structure comprising probabilities of each database operator in the set transitioning to each of one or more of the other database operators in the set; obtaining a new query to be processed in the at least one database; applying a stochastic prediction algorithm to identify, from among the one or more historical query plans, at least one candidate query plan for the new query based at least in part on the data structure; and executing the at least one candidate query plan to access data from the at least one database for the new query.

Illustrative embodiments can provide significant advantages relative to conventional query processing techniques. For example, challenges associated with generating execution plans for queries are overcome in one or more embodiments by applying a stochastic prediction algorithm to predict one or more historical query plans to apply for a new query.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Generally, there are two categories of query optimizers currently used in database management systems, namely, Cost-Based Optimizers (CBOs) and Rule-Based Optimizers (RBOs). A RBO follows a set of rules (e.g., based on indexes and types of indexes) to produce an execution plan. A CBO analyzes multiple candidate query plans for a given query, estimates the cost of each candidate query plan, and then selects a plan with the lowest cost for execution. In some situations, there are too many candidate plans for a CBO to optimize (e.g., due to time constraints). In these situations, the CBO can select the plan having the lowest cost from among the plans that have been evaluated during a specified time period.

In order to improve efficiency, some database management systems (DBMSs) are configured for a limited number of specific applications, as opposed to providing a common service that attempts to cover a broad range of applications. For example, in online analytical processing (OLAP) scenarios, a DBMS can be configured to process many computing operations that often include complicated queries such as join operations with multiple tables, aggregation, and filter conditions. One factor that affects the efficiency of OLAP is the number of queries that need to be processed, however, this typically cannot be practically controlled as it depends on the specific demands of the application.

Another factor is the speed at which the query optimizer generates execution plans, and this frequently becomes a bottleneck of the DBMS. As an example, in a financial OLAP scenario, the query optimizer may need to process thousands of queries, many of which may be the same or very similar. For example, some queries may have different select fields, but have the same or substantially similar filter conditions. Typically, a query optimizer determines an execution plan for each query individually and does not consider execution plans that were previously generated. Accordingly, the query optimizer often performs substantial amounts of redundant work, thereby increasing the time needed to generate the execution plans.

Figure 1:
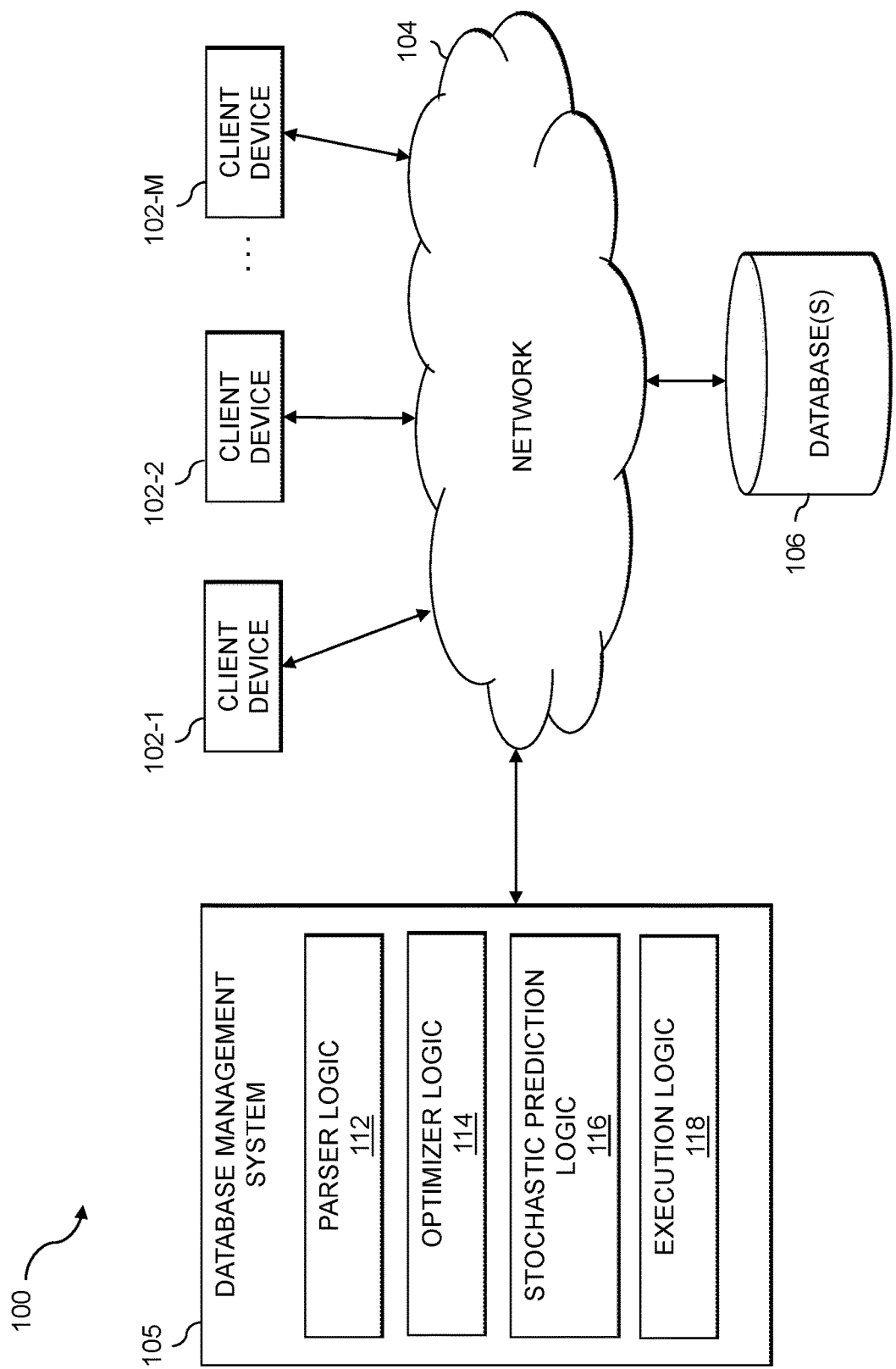
FIG. 1 shows an information processing system configured for query processing using a stochastic prediction model in an illustrative embodiment.

FIG. 1 shows a computer network (also referred to herein as an information processing system) 100 configured for processing queries based on a stochastic prediction model in accordance with an illustrative embodiment. The computer network 100 comprises a plurality of client devices 102-1, 102-2, . . . 102-M, collectively referred to herein as client devices 102. The client devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a database management system (DBMS) 105.

The client devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The client devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the DBMS 105 can have at least one associated database 106 configured to store data associated with one or more of the client devices 102, for example.

An example database 106, such as depicted in the present embodiment, can be implemented using one or more storage systems associated with the DBMS 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the DBMS 105 are one or more input-output devices, which illustratively comprise keyboards, displays or other types of input-output devices in any combination. Such input-output devices can be used, for example, to support one or more user interfaces to the DBMS 105, as well as to support communication between DBMS 105 and other related systems and devices not explicitly shown.

Additionally, the DBMS 105 in the FIG. 1 embodiment is assumed to be implemented using at least one processing device. Each such processing device generally comprises at least one processor and an associated memory, and implements one or more functional modules for controlling certain features of the DBMS 105.

More particularly, the DBMS 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the DBMS 105 to communicate over the network 104 with the client devices 102, and illustratively comprises one or more conventional transceivers.

The DBMS 105 further comprises parser logic 112, optimizer logic 114, stochastic prediction logic 116, and execution logic 118.

Generally, the parser logic 112 obtains software code (e.g., in a database language such as SQL) from one or more of the client devices 102 pertaining to data in the database 106. As an example, the software code may include one or more user queries for retrieving data from the database 106. The parser logic 112 parses the software code to create a parse tree (e.g., an abstract syntax tree (AST)), which is translated into a logical plan using relational algebra.

The optimizer logic 114 obtains the logical plan from the parser logic 112 and determines an execution query plan based at least in part on the stochastic prediction logic 116, as described in more detail elsewhere herein. The execution query plan is provided to execution logic 118 for execution.

In some embodiments, the optimizer logic 114 logs the execution plans it generates and, optionally, logs statistics associated with the execution plans. The optimizer logic 114, in one embodiment, builds a cache pool (not explicitly shown in FIG. 1) based on the logs, as described in more detail in conjunction with FIG. 4, for example. The cache pool caches operators of the query plans based on analysis of the information in the logs. For example, each query execution plan that is executed (e.g., by execution logic 118) can be recorded, which can be analyzed to determine the frequency of the operators and frequency of query paths being executed. A probability matrix (which can be represented as a directed graph, for example), can be built using this information. The directed graph may have a level structure, where operators at each level may be considered candidates for predicating a next operator of a given query, for example.

The stochastic prediction logic 116 applies a stochastic prediction algorithm (e.g., a Markov prediction algorithm) to predict one or more historical execution plans that are related to a given query, which can be used by the optimizer logic 114 for determining the query execution plan for the given query. In some embodiments, the stochastic prediction logic 116 includes building a probability transition matrix based on the cache pool. The probability transition matrix can be used to predict the one or more historical execution plans, as described in more detail elsewhere herein.

The query execution plan selected by the optimizer logic 114 is provided to the execution logic 118, which generates the output of the query by executing the query plan.

It is to be appreciated that this particular arrangement of elements 112, 114, 116, and 118 illustrated in the DBMS 105 of the FIG. 1 embodiment is presented by way of example only, and alternative arrangements can be used in other embodiments. For example, the functionality associated with the elements 112, 114, 116, and 118 in other embodiments can be combined into a single element, or separated across a larger number of elements. As another example, multiple distinct processors can be used to implement different ones of the elements 112, 114, 116, and 118 or portions thereof. Also, although DBMS 105 is shown separate from client devices 102, this is not intended to be limiting, and in other embodiments at least portions of elements 112, 114, 116, and 118 may be implemented on one or more of the client devices 102, for example.

At least portions of elements 112, 114, 116, and 118 may be implemented at least in part in the form of software that is stored in memory and executed by a processor.

It is to be understood that the particular set of elements shown in FIG. 1 for DBMS 105 involving client devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the DBMS 105 and database(s) 106 can be on and/or part of the same processing platform.

An exemplary process utilizing elements 112, 114, 116, and 118 of an example DBMS 105 in computer network 100 will be described in more detail with reference to, for example, the flow diagram of FIG. 5.

The stochastic prediction logic 116, in some embodiments, is based on a Markov model. Generally, a Markov model models pseudo-randomly changing systems with the assumption that a future state depends only on the current state, and the future state is not related to the previous state. A Markov chain is an example of the Markov model. More specifically, a Markov chain is a mathematical system that experiences transitions from one state to another according to certain probabilistic rules. One characteristic of a Markov chain is that no matter how the process arrived at its present state, the possible future states are fixed. In a Markov chain, a transition probability is the probability of transition from one state to another. The transition probabilities can be represented as a transition matrix or transition graph, for example.

Figures 2A, 2B:
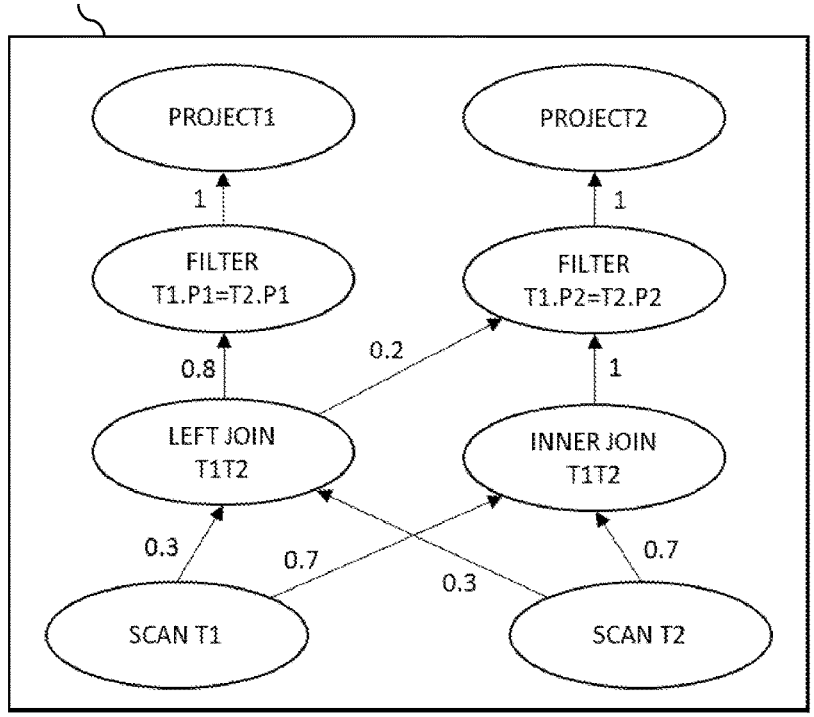
FIG. 2A shows an example of a transition matrix.
FIG. 2B shows an example of a transition graph in accordance with illustrative embodiments.

FIG. 2A shows an example of a transition matrix 200 in an illustrative embodiment. Each entry in the transition matrix 200 represents a probability of transitioning from one state to another state. For example, if it is assumed that the current state is SCAN T1, then transition matrix 200 indicates that the probability of transitioning to state LEFT JOIN T1T2 is 0.3, and the probability of transitioning to state INNER JOIN T1T2 is 0.7. FIG. 2B shows an example of a transition graph 210. Generally, the transition graph 210 represents the same (or similar) information as the transition matrix 200 in the form of a graph. Accordingly, the transition matrix 200 and the transition graph 210 can be used to represent a query plan corresponding to a sequence of steps used to access data, where the transition probability can be defined as the probability of transitioning from one step to another.

Figure 3:
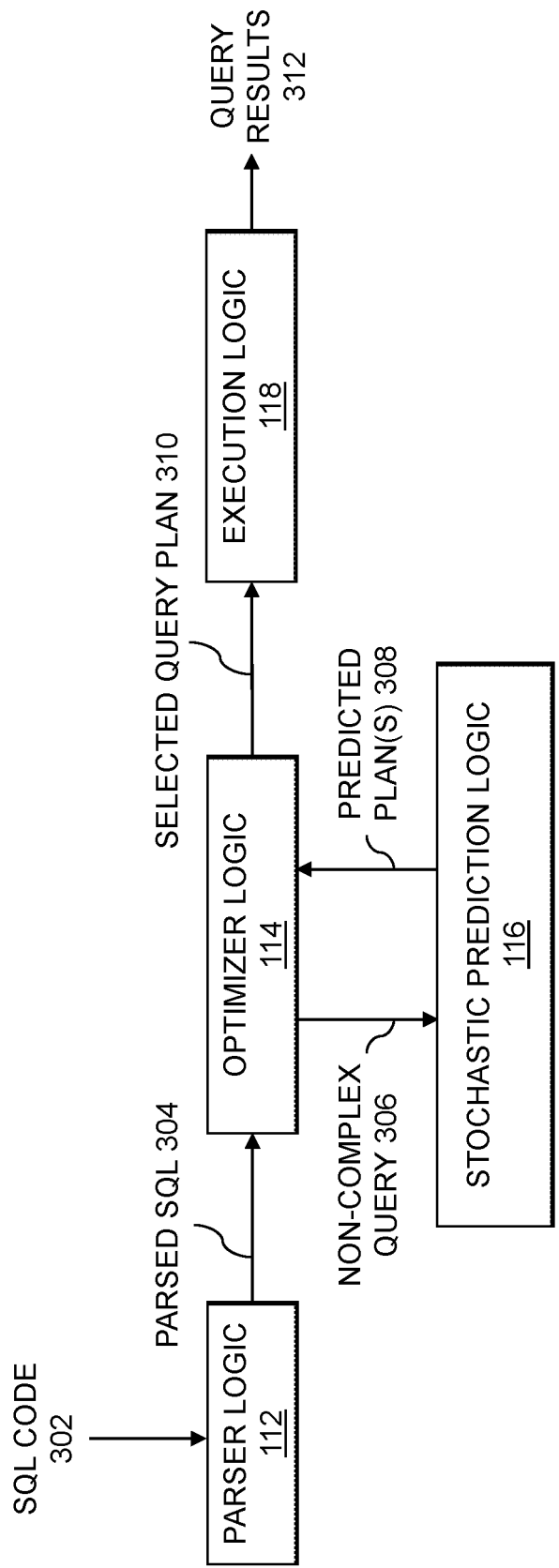
FIG. 3 shows a query processing workflow involving a stochastic prediction model in an illustrative embodiment.

Referring now to FIG. 3, this figure shows an example of a workflow involving a stochastic prediction model in an illustrative embodiment. In the example depicted in FIG. 3, the parser logic 112 obtains and parses SQL code 302, which is then output as parsed SQL 304 to the optimizer logic 114. The optimizer logic 114, in this embodiment, can analyze a complexity of the parsed SQL 304. If it is determined that the complexity of the parsed SQL is below a threshold complexity value, then the parsed SQL 304 is passed to the stochastic prediction logic 116 as a non-complex query 306.

In at least some examples, the complexity of the parsed SQL 304 can correspond to a time needed to generate a query plan. The parsed SQL 304 can be considered complex when the time exceeds a certain threshold time value. For the case of an OLAP query, the time to generate the query plan can be estimated based on the historical logs, which is suitable for most cases as OLAP does not change frequently.

The stochastic prediction logic 116 implements a stochastic prediction method to identify one or more predicted plans 308, which are returned to the optimizer logic 114. The optimizer logic 114 selects a query plan 310 from among the predicted plans 308 based on, for example, the estimated costs for carrying out each of the predicted plans 308. The cost of the predicted plans 308 may be estimated using an approach that is similar to the approach typically used by a CBO. As an example, the number of resources required for each operation can be estimated based on metadata and statistics. Examples of metadata include, for example, index information, record and index sizes, and examples of statistics that may be used to estimate the cost include table statistics, column statistics, index statistics, and/or system statistics. The selected query plan 310 is provided to the execution logic 118, which produces the query results 312 associated with the SQL code 302.

Figure 4:
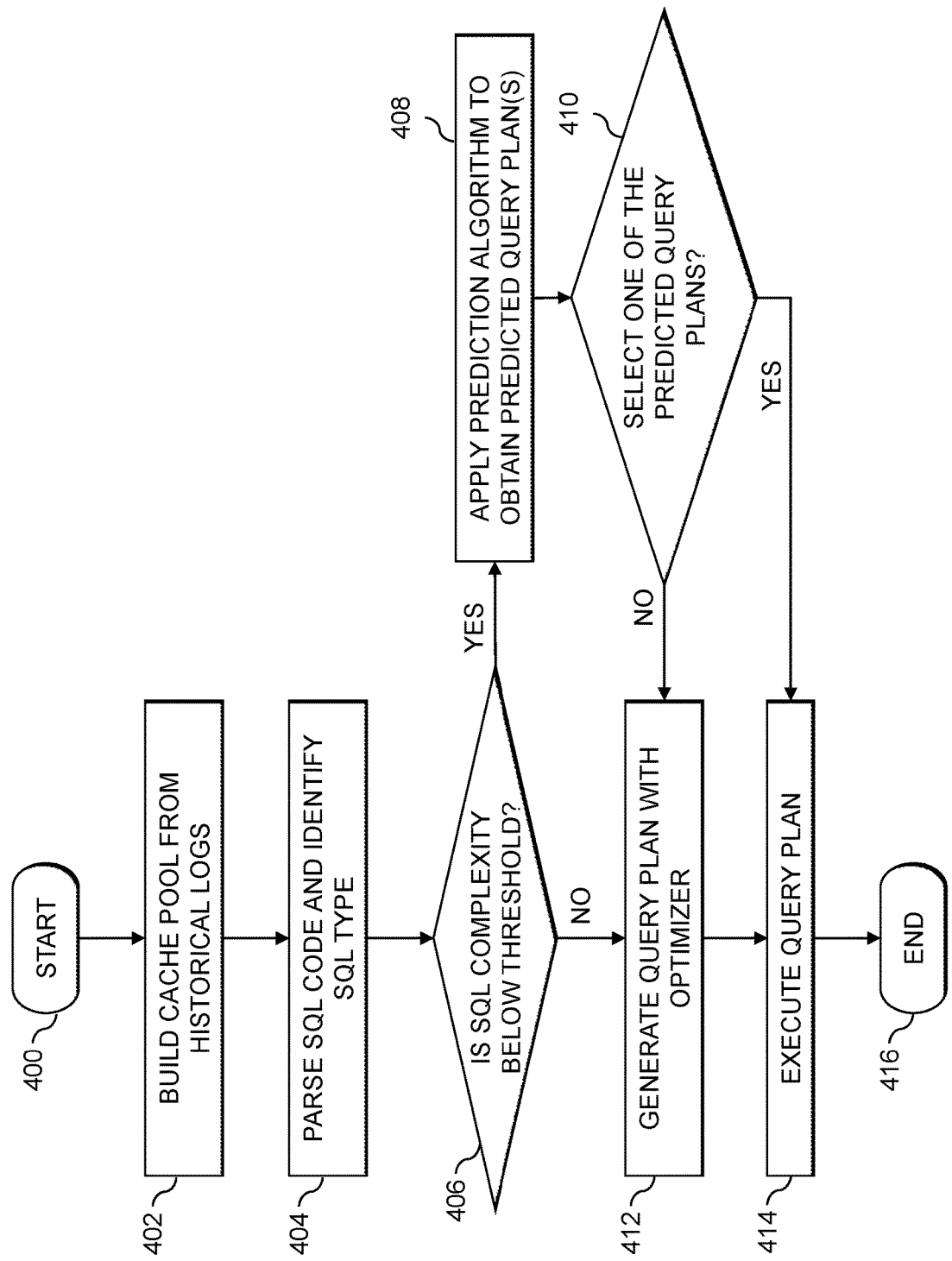
FIG. 4 shows a flow diagram of a query processing algorithm in an illustrative embodiment.

FIG. 4 shows a flow diagram of a query processing algorithm in an illustrative embodiment. The FIG. 4 process starts at step 400. Step 402 includes building a cache pool from historical logs. For example, the cache pool can be built based on a running history of logs associated with query plans. More specifically, log code can be inserted for each query that is used to build the running history of the logs. The logs, for example, can include information relating to one or more of: query types, query complexities, query costs, and query distributions. This information can be analyzed to cache the operators of the query plans in the cache pool.

Step 404 includes parsing SQL code related to a user query and identifying a type of the SQL code.

Step 406 includes performing a test to check whether the complexity of the SQL code is below some threshold level of complexity.

If the result of step 406 is yes, then the process continues to step 408; otherwise, the process continues to step 412.

Step 408 includes applying a prediction algorithm to obtain one or more predicted query plans. For example, the cache pool built in step 402 may comprise information related to query trees for historical queries, where each query tree can include a plurality of different operators (e.g., scan, join, filter, project, and aggregation operators). Some of the operators represented in different query trees may overlap.

The prediction algorithm in step 408, in some embodiments, can utilize a Markov model in the form of a transition matrix of operators, where the transition probabilities of the transition matrix indicate the probability that a given query node (corresponding to a current operator, for example) selects a next operator. Accordingly, step 408 may include applying a Markov prediction algorithm that generates a full query tree based on the historical query plans, where the tree is a graph having nodes that represent different operators. A query tree is generated in some embodiments by predicting operators one-by-one from the bottom to the top. In some instances, there may not be a single unique query tree, and so the prediction algorithm can provide a plurality of predicted query plans to the optimizer. A more particular example of a Markov prediction algorithm is described in more detail elsewhere herein.

Step 410 includes checking whether the optimizer (e.g., corresponding to optimizer logic 114) selects one of the predicted query plans. If no, then the process continues to step 412; otherwise, the process continues to step 414.

Step 412 includes generating a query plan with the optimizer. For example, the plan can be generated using a cost-based or rule-based approach.

Step 414 includes executing the query plan that was either generated at step 412 or selected at step 410. The process ends at step 416.

For more complex queries, the predicted query plans may not be sufficiently accurate, and thus the prediction algorithm can be avoided to avoid increasing the latency of producing a query plan. Accordingly, in some embodiments, step 406 can prevent the prediction algorithm from being applied for more complex queries.

A detailed example of a prediction algorithm in accordance with at least some embodiments is now described with reference to the notations listed in the following table:

| Notation | Description |
| --- | --- |
| h | Maximum level of predicted query plan tree, where h > 0. |
| l | Level of predicted query plan tree, where l = 1, 2, . . . , h. |
| $n_l$ | Number of Candidate operators in level l, where l = 1, 2, . . . , h. |
| $m_l$ | Maximum number of predicted operators in level l, where l = 1, 2, . . . , h. |
| $X_{l,i}$ | State of choosing an operator (e.g., scan, index, join, filter, project, etc.), which is located in level l, and its index in this level is i, where l = 1, 2, . . . , h, i = 1, 2, . . . , $m_l$. |
| $x_{l,i}$ | Location of an operator, l = 1, 2, . . . , h, i = 1, 2, ... , $m_l$. |
| $f_k(x_{l,i})$ | The top k maximum access frequency of operators used in the first level, such as: $f_k(x_{l,i})$, l = 1, 2, . . . , h, i = 1, 2, . . . , $m_1$, 0 < k ≤ $m_1$. |
| $S_l$ | A set of chosen operators on level l, where each operator is unique and l = 1, 2, . . . , h. |
| $Pr(X_{l+1,k} = x_{l+1,k} \| X_{l,j} = x_{l,j})$ | Prior operator is X1,j, the probability of choosing operator $x_{l+1,k}$, where j = 1, 2, . . . , $m_l$, k = 1, 2, . . . , $n_{l+1}$. |
| P | Operators transition matrix, which represents the probability of transforming from one prior operator to the next operator. |
| $P_{ab}$ | Element (a, b) in P, where $P_{ab}$ = $Pr(X_{l+1}$ = b $\|X_l$ = a ). |
| $QP_n$ | nth query plan of predicted query plans set, where n > 0. |
| QPs | All predicted query plans, where QPs = [$QP_i$] (i > 0). |

A prediction algorithm in accordance with one or more embodiments includes the following steps (which can be performed at least in part by stochastic prediction logic 116, for example):

Step 1: Select first level operators. The first level of operators is selected differently than the other levels as the first level has no prior operators, and often form the bottom of the query tree. Thus, the operators of the first level are fetched based on their respective access frequencies. More specifically, the first level of operators (i.e., level 1), is obtained by sorting the frequencies to obtain the top k maximum frequency. Step 1 can be described formulaically as:

$Pr(X_{1,1}=x_{1,i})=f_1(x_{1,i}), i=1 \ldots n_1$ $Pr(X_{1,2}=x_{1,i})=f_2(x_{1,i}), i=1 \ldots n_1$ $Pr(X_{1,m_1}=x_{1,i})=f_k(x_{1,i}), i=1 \ldots n_1$ $S_1=[x_{1,1}, x_{1,2}, \ldots, x_{1,m_1}]$ Step 2: Based on the results of step 1, $S_1$ is used as the prior operators set. For each operator is $S_1$, the probability of its adjacent operators is calculated based on the transition matrix. In some examples, as a default, maximum probability may be chosen from its adjacent operators. Therefore, the operators in $S_2$ are all predicted from $S_1$, and have no relationship with the operators of other levels. Step 2 can be described formulaically as:

$Pr(X_{2,1}=x_{2,1}|X_{1,1}=x_{1,i})=\max(p_{x_{1,i},x_{2,j}}), x_{1,i} \in S_1, i=1 \ldots n_1, j=1 \ldots n_2$ $Pr(X_{2,2}=x_{2,2}|X_{1,2}=x_{1,i})=\max(p_{x_{1,i},x_{2,j}}), x_{1,i} \in S_1, i=1 \ldots n_1, j=1 \ldots n_2$ $Pr(X_{2,m_2}=x_{2,m_2}|X_{1,i}=x_{1,i})=\max(p_{x_{1,i},x_{2,j}}), x_{1,i} \in S_1, i=1 \ldots n_1, j=1 \ldots n_2$ $S_2=[x_{2,1}, x_{2,1}, \ldots, x_{2,m_2}]$, $x_{2,j}$ is parent node of parts of $x_{1,m_i}$, i=1 \ldots $n_1$, j=1 \ldots $n_2$

. . .

$Pr(X_{h,m_h}=x_{h,m_h}|X_{h-1,i}=x_{h-1,i})=\max(p_{x_{h-1,i},x_{h,j}}), x_{1,i} \in S_{h-1}, i=1 \ldots n_{h-1}, j=1 \ldots n_h$ $S_h=[x_{h,1}, x_{h,2}, \ldots, x_{h,m_h}]$, $x_{h,j}$ is parent node of parts of $x_{h-1,m_i}$, i=1 \ldots $n_{h-1}$, j=1 \ldots $n_h$ $S_h=[x_{h,0}, x_{h,1}, \ldots, x_{h,m_h}]$ Step 3: Step 2 results in the set of operators from level 1 to level h, and also declares the relationships between adjacent levels. Based on this, a query tree from $S_1$ to $S_h$ is built in Step 3. Step 3 can be described formulaically as:

$QP_1=\{S_1, S_2, \ldots, S_h\}$

Step 4: Sometimes, adjacent operators have a similar probability (e.g., within some specified range). The initial fetch algorithm is always choosing the biggest probability operator. That will not always return the matched operators, and so a prediction algorithm is defined, which returns the top k maximum probabilities and selected operators. The prediction algorithm is implemented to replace max($p_{ab}$). More, specifically:

Define predicted($p_{ab}$)=top(k), k=1 \ldots $m_l$ $Pr(X_{l,m_l}=x_{l,m_l}|X_{l-1,i}=x_{l-1,i})=$predicted$(p_{x_{l-1,i},x_{l,j}}), x_{l-1,i} \in S_{l-1}, i=1 \ldots n_{l-1}, j=1 \ldots n_l$ $S_l=[x_{l,1},x_{l,2},\ldots,x_{l,m_l}], x_{l,j}$ is parent node of parts of
$x_{l-1,m_l}, l>0, i=1\ldots n_{h-1}, j=1\ldots n_h$ $QP_n=[S_l], l>0, l=1,2,\ldots,h$ Step 5: Based on the results of steps 1-4, the set of predicted query plans is generated and returned, namely:

$QPs=[QP_1, QP_2, \ldots, QP_n]$

Figure 5:
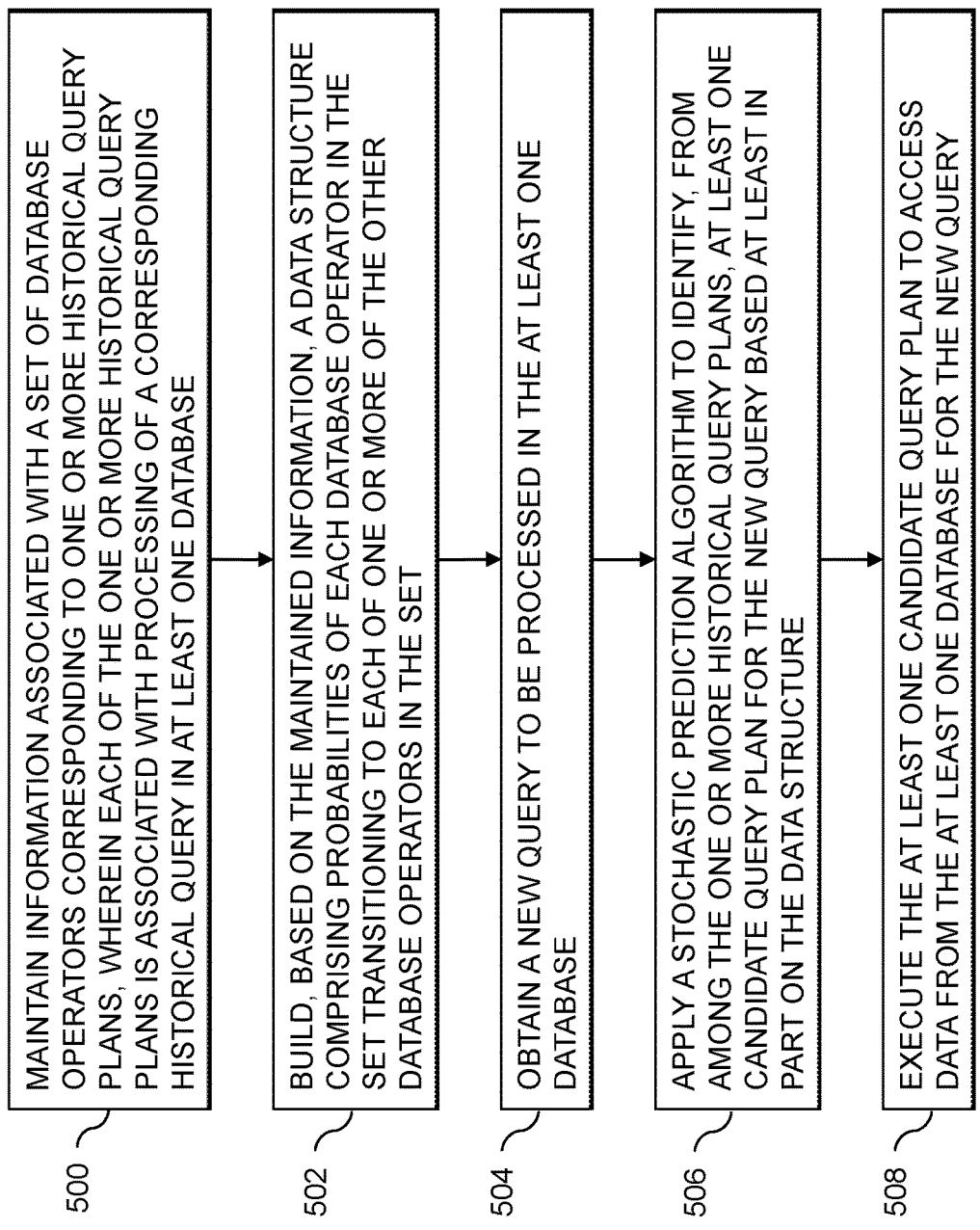
FIG. 5 shows a flow diagram of an example of a process for query processing using a stochastic prediction model in an illustrative embodiment.

FIG. 5 is a flow diagram of a process for processing queries based on a stochastic prediction model in an illustrative embodiment. It is to be understood that this particular process is only an example, and additional or alternative processes can be carried out in other embodiments.

In this embodiment, the process includes steps 500 through 508. These steps are assumed to be performed by the database management system 105 utilizing its elements 112, 114, 116, and 118.

Step 500 includes maintaining information associated with a set of database operators corresponding to one or more historical query plans, wherein each of the one or more historical query plans is associated with processing of a corresponding historical query in at least one database. Step 502 includes building, based on the maintained information, a data structure comprising probabilities of each database operator in the set transitioning to each of one or more of the other database operators in the set. Step 504 includes obtaining a new query to be processed in the at least one database. Step 506 includes applying a stochastic prediction algorithm to identify, from among the one or more historical query plans, at least one candidate query plan for the new query based at least in part on the data structure. Step 508 includes executing the at least one candidate query plan to access data from the at least one database for the new query.

The stochastic prediction algorithm may include a Markov prediction algorithm. The maintaining may include: generating a cache pool comprising the set of database operators from the one or more historical query plans. The data structure may include at least one of: a transition matrix and a transition graph. The maintained information may be related to one or more of: query types, query complexities, query computing costs, and query distributions. The stochastic prediction algorithm may be performed in response to determining that a level of complexity of the new query satisfies a threshold level of complexity. The stochastic prediction algorithm may identify multiple candidate query plans for the new query, and an optimizer of a database management system may select one of the multiple candidate query plans to be executed. The at least one candidate query plan may include a series of operations to access the data from the at least one database, wherein each of the operations is associated with one or more of the database operators in the set. The stochastic prediction algorithm may include: determining a first one of the operations based at least in part on access frequencies associated with the set of database operators; and determining at least a second one of operations based at least in part on the probabilities in the data structure with respect to the one or more of the database operators associated with the previous operation in the series. The set of database operators may include one or more structure query language operators. The new query may include an OLAP query.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve the efficiency and speed with which a database management system generates query plans. These and other embodiments can effectively overcome problems associated with existing testing techniques that often require the optimizer to perform redundant work when generating execution query plans. For example, some embodiments are configured maintain information related to previously generated execution plans and use this information to suggest candidate plans for new queries. These and other embodiments can effectively improve the speed and efficiency with which execution plans are generated relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionalities within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
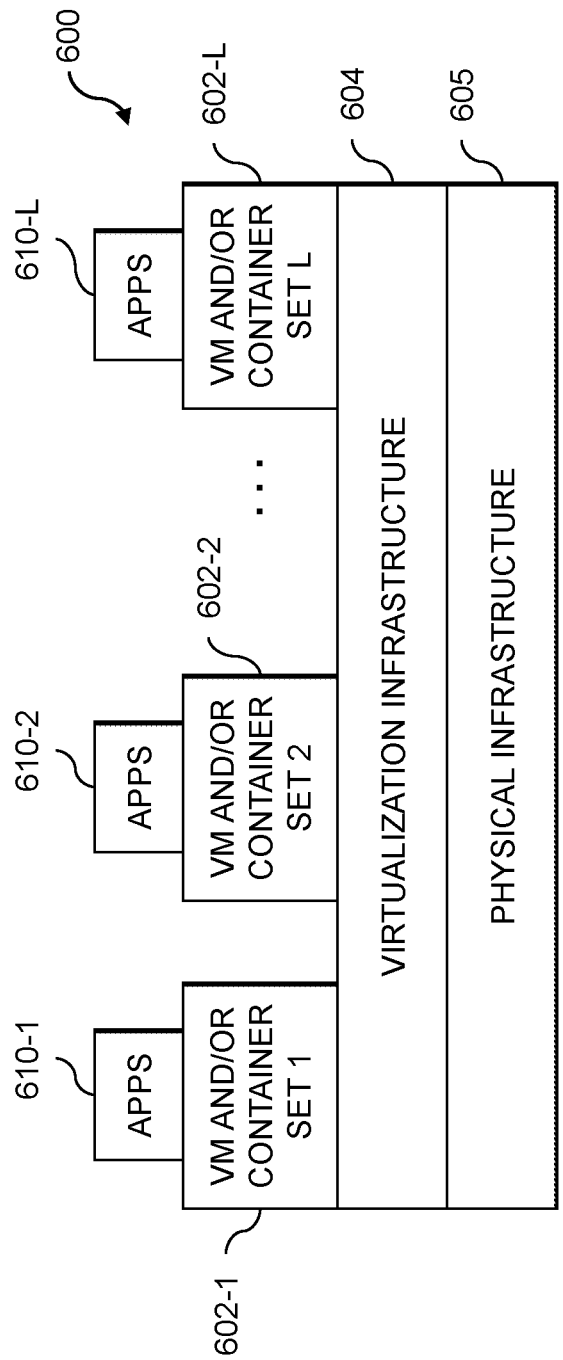
FIGS. 6 and 7 show examples of processing platforms that may be utilized to implement at least a portion of an information processing system in illustrative embodiments.
Figure 7:
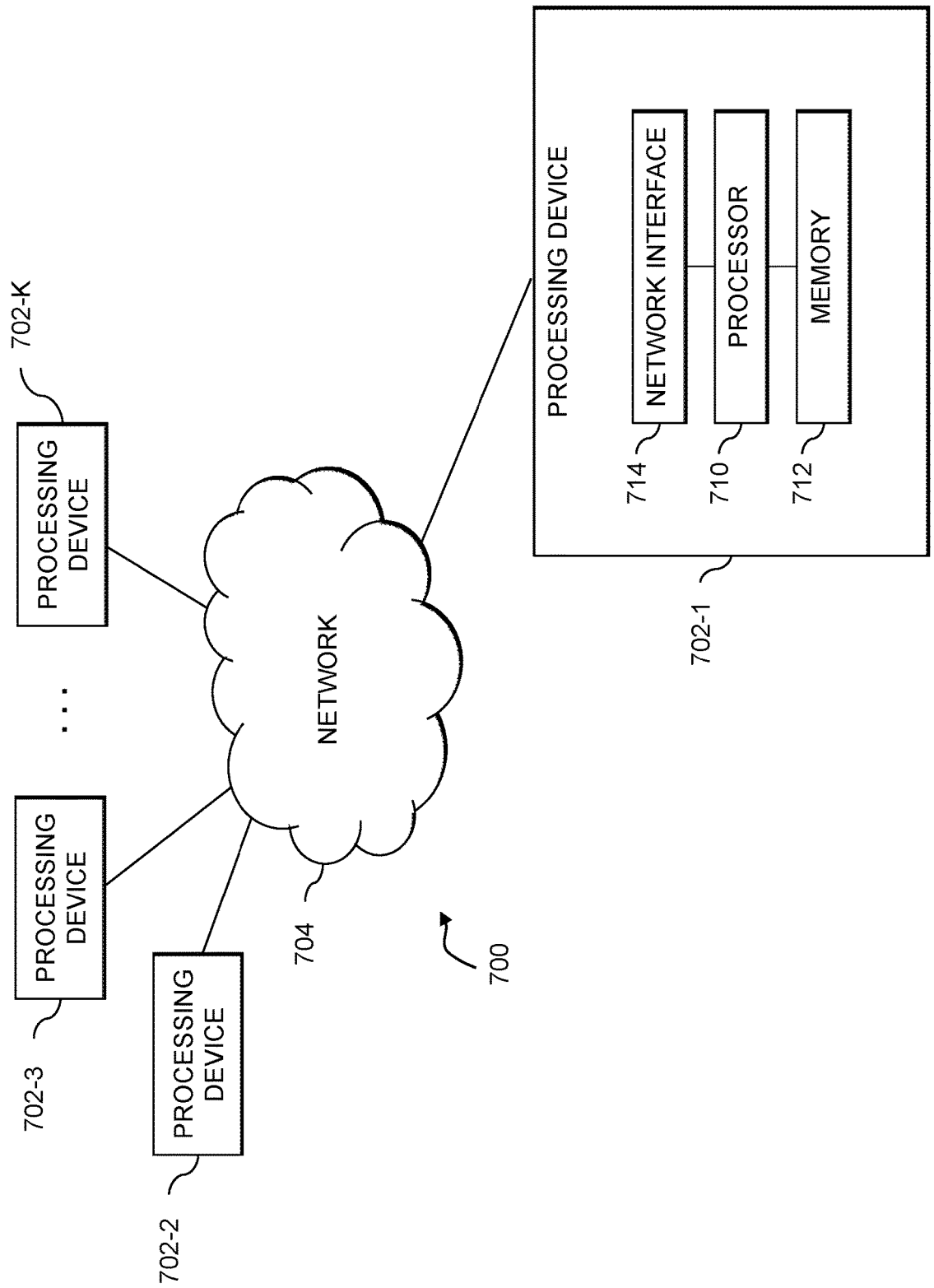

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    maintaining information associated with a set of database operators corresponding to one or more historical query plans, wherein each of the one or more historical query plans is associated with processing of a corresponding historical query in at least one database;
    building, based on the maintained information, a data structure comprising probabilities of each database operator in the set transitioning to each of one or more of the other database operators in the set;
    obtaining a new query to be processed in the at least one database;
    applying a stochastic prediction algorithm to identify, from among the one or more historical query plans, at least one candidate query plan for the new query based at least in part on the data structure; and
    executing the at least one candidate query plan to access data from the at least one database for the new query;
    wherein the method is performed by at least one processing device comprising a processor coupled to a memory.

2. The computer-implemented method of claim 1, wherein the stochastic prediction algorithm comprises a Markov prediction algorithm.

3. The computer-implemented method of claim 1, wherein the maintaining comprises:
    generating a cache pool comprising the set of database operators from the one or more historical query plans.

4. The computer-implemented method of claim 1, wherein the data structure comprises at least one of: a transition matrix and a transition graph.

5. The computer-implemented method of claim 1, wherein the maintained information is related to one or more of: query types, query complexities, query computing costs, and query distributions.

6. The computer-implemented method of claim 1, wherein the stochastic prediction algorithm is performed in response to determining a level of complexity of the new query satisfies a threshold level of complexity.

7. The computer-implemented method of claim 1, wherein the stochastic prediction algorithm identifies multiple candidate query plans for the new query, and wherein an optimizer of a database management system selects one of the multiple candidate query plans to be executed.

8. The computer-implemented method of claim 1, wherein the at least one candidate query plan comprises a series of operations to access the data from the at least one database, wherein each of the operations is associated with one or more of the database operators in the set.

9. The computer-implemented method of claim 8, wherein the stochastic prediction algorithm comprises:
    determining a first one of the operations based at least in part on access frequencies associated with the set of database operators; and
    determining at least a second one of operations based at least in part on the probabilities in the data structure with respect to the one or more of the database operators associated with the previous operation in the series.

10. The computer-implemented method of claim 1, wherein the set of database operators comprises one or more structure query language operators.

11. The computer-implemented method of claim 1, wherein the new query comprises an online analytical processing query.

12. A non-transitory processor-readable storage medium having stored therein program code of one or more software programs, wherein the program code when executed by at least one processing device causes the at least one processing device:
    to maintain information associated with a set of database operators corresponding to one or more historical query plans, wherein each of the one or more historical query plans is associated with processing of a corresponding historical query in at least one database;
    to build, based on the maintained information, a data structure comprising probabilities of each database operator in the set transitioning to each of one or more of the other database operators in the set;
    to obtain a new query to be processed in the at least one database;
    to apply a stochastic prediction algorithm to identify, from among the one or more historical query plans, at least one candidate query plan for the new query based at least in part on the data structure; and
    to execute the at least one candidate query plan to access data from the at least one database for the new query.

13. The non-transitory processor-readable storage medium of claim 12,
    wherein the stochastic prediction algorithm comprises a Markov prediction algorithm.

14. The non-transitory processor-readable storage medium of claim 12, wherein the maintaining comprises:
    generating a cache pool comprising the set of database operators from the one or more historical query plans.

15. The non-transitory processor-readable storage medium of claim 12, wherein the data structure comprises at least one of: a transition matrix and a transition graph.

16. The non-transitory processor-readable storage medium of claim 12, wherein the maintained information is related to one or more of: query types, query complexities, query computing costs, and query distributions.

17. An apparatus comprising:
at least one processing device comprising a processor coupled to a memory;
the at least one processing device being configured:
to maintain information associated with a set of database operators corresponding to one or more historical query plans, wherein each of the one or more historical query plans is associated with processing of a corresponding historical query in at least one database;
to build, based on the maintained information, a data structure comprising probabilities of each database operator in the set transitioning to each of one or more of the other database operators in the set;
to obtain a new query to be processed in the at least one database;
to apply a stochastic prediction algorithm to identify, from among the one or more historical query plans, at least one candidate query plan for the new query based at least in part on the data structure; and
to execute the at least one candidate query plan to access data from the at least one database for the new query.

18. The apparatus of claim 17, wherein the stochastic prediction algorithm comprises a Markov prediction algorithm.

19. The apparatus of claim 17, wherein the stochastic prediction algorithm comprises a Markov prediction algorithm, wherein the maintaining comprises:
generating a cache pool comprising the set of database operators from the one or more historical query plans.

20. The apparatus of claim 17, wherein the data structure comprises at least one of: a transition matrix and a transition graph.

\* \* \* \* \*